May 15, 1956 V. F. ZAHODIAKIN 2,745,162
FASTENING DEVICES
Filed July 18, 1952 2 Sheets-Sheet 1
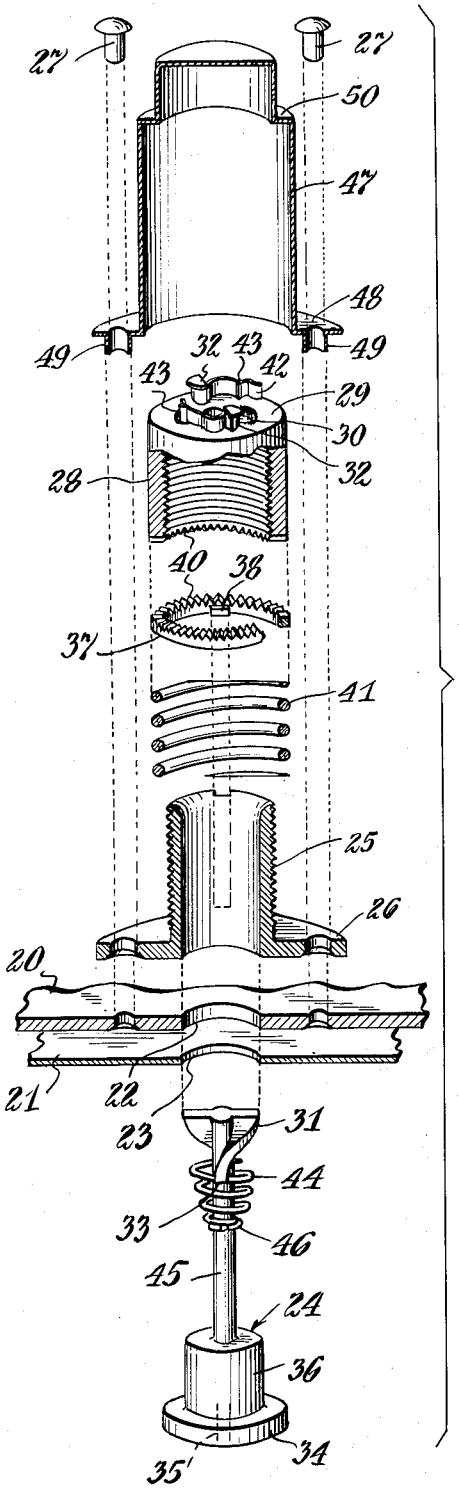
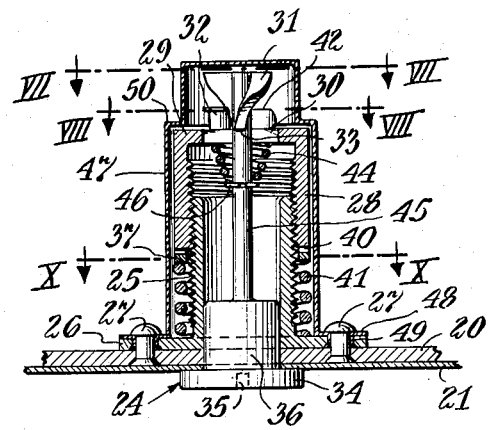
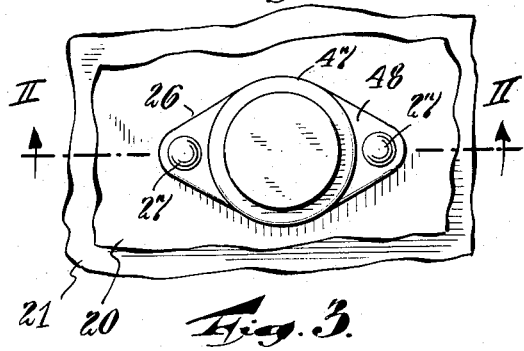
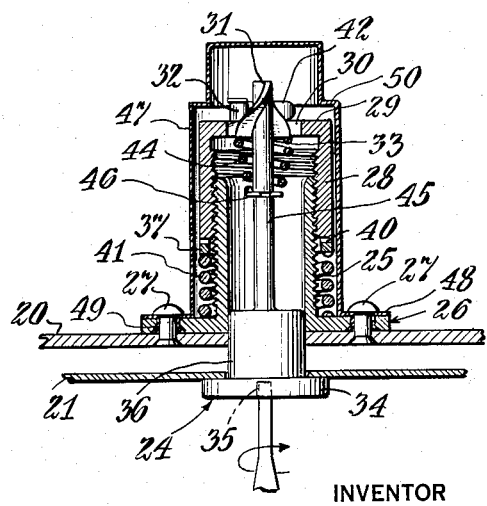
INVENTOR
VICTOR F. ZAHODIAKIN
BY
Howard P. King
ATTORNEY May 15, 1956 V. F. ZAHODIAKIN 2,745,162
FASTENING DEVICES
Filed July 18, 1952 2 Sheets-Sheet 2

INVENTOR
VICTOR F. ZAHODIAKIN.
BY
Howard P. King
ATTORNEY

United States Patent Office 2,745,162
Patented May 15, 1956

2,745,162

FASTENING DEVICES

Victor F. Zahodiakin, Summit, N. J.

Application July 18, 1952, Serial No. 299,556

4 Claims. (Cl. 24—221)

This invention relates to a fastening device, and more particularly to the quick-fastening stud and socket type which obtains an interlock by engaging the stud with and twisting it in the socket.

While the most common means for releasably holding members together is the common bolt and nut, there have been some efforts to improve thereover with stud and socket type of fasteners, but they have not been completely satisfactory for various reasons, of which one is inability of a single fastener to be usable under varying conditions. Fastening devices of this character find extensive use in airplanes and elsewhere, for such specific purposes as securing the fuselage, compartments, brackets, hinges and other parts and devices and for fulfilling multitudinous requirements too numerous to be cataloged herein. But suffice it to say, that heretofore a great assortment of sizes of fastening devices has been required, and this largely due to the fact that fasteners of the prior art were made to accommodate definite thicknesses and/or number of elements to be clamped, a different fastener being required for each condition encountered. Furthermore, an inherent defect of prior art fastening means, often necessitating reversion to use of the time consuming bolt and nut, has been the development in some installations lateral or tilting deflection of the stud when subjected to shear loads. Such deflection has been one of the principal causes of the prior art fastening devices opening or becoming inadvertently dislodged, and cause of opening or dislodgement has been aggravated by, or independently effected, by excessive vibration to which the members are at times subjected in use.

Also prior art devices have provided no compensation for wear, and have, in fact, added to the probability of wear. While some, at least, of these difficulties may be overcome by use of an ordinary bolt and nut and lockwasher, such a substitution is a step backward, rather than forward, and a quick fastening device is still desired in preference to tedious and sometimes impractical application of bolts and nuts. Almost invariably quick fastening devices of the prior art have depended upon spring tension or compression sustaining the load applied to the device, and due to fatigue, heat or other causes, the spring loading has varied and often failed utterly through breakage, disruption, or otherwise, and when the spring fails or becomes impaired in such devices the fastening device loosens and usually opens.

Having in mind the foregoing and other drawbacks and deficiences of the prior art, the present invention proposes an improved construction of fastening device.

In its broadest aspect, the invention has for its objective the provision of a fastening device which will be readily applicable and of a more universal character.

Another object of the invention is to provide a fastening device which will not become angularly displaced in use.

Closely related to the foregoing object is one proposing a structure which will not be opened either by application of shear stresses or by vibration.

A further object of the invention is to provide a fastening device which will accommodate and be readily adjustable to clamp a varying number and/or thicknesses of members to be clamped.

An essential object of the invention is to provide a fastening device which avoids interposing a spring between the gripping means and the members being clamped, or, in other words, one which avoids loading a spring with the load carried by the fastening device.

Yet another object of the invention is to provide a fastening device which will suppress wear between members being clamped and which can compensate for any wear that may occur.

Another object of the invention is to provide a fastening device which is applicable to members that have become somewhat distorted and which tend to straighten the members and grip them securely.

A further object of the invention is to provide a fastening device that requires no special tools and is readily applied and released when desired in the field.

Still further objects, advantages and results will become evident to persons skilled in the art to which the invention appertains as the description proceeds, both by direct recitation thereof and by implication from the context.

Referring to the accompanying drawings in which like numerals of reference indicate similar parts throughout the several views;

Figure 1 is a plan of the fastening device installed in use;

Figure 2 is a section on line II—II of Fig. 1;

Figure 3 is a view similar to Fig. 2 showing the device in process of being applied to grip members together;

Figure 4 is an exploded perspective section on the same plane as Figs. 2 and 3;

Figure 5:
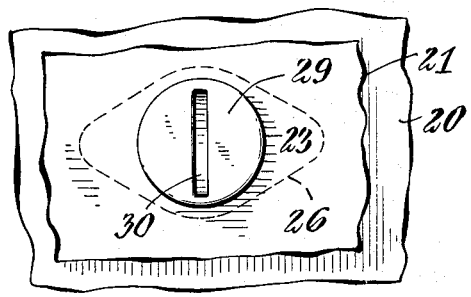
Figure 5 is an underneath view before introduction of the stud.
Figure 6:
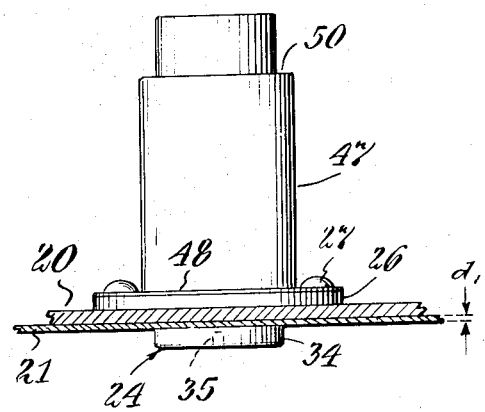
Figure 6 is an elevation of the device shown applied to members illustrated in section.
Figure 7:
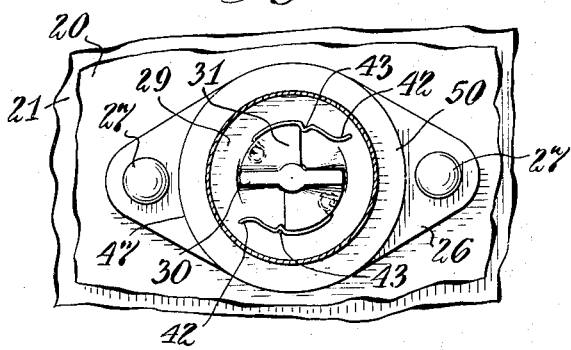
Figures 7 and 8 are cross-sectional views on lines VII—VII and VIII—VIII respectively of Fig. 2.
Figure 12:
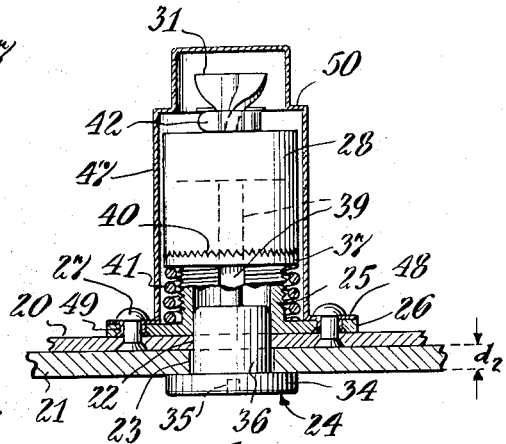
Figure 12 is a sectional elevation similar to Fig. 2, and showing a different thickness of members clamped by the device.
Figure 8:
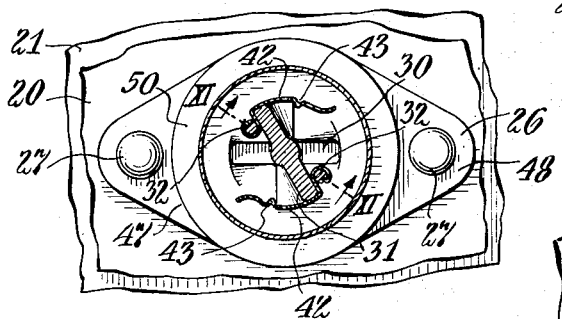
Figure 10:
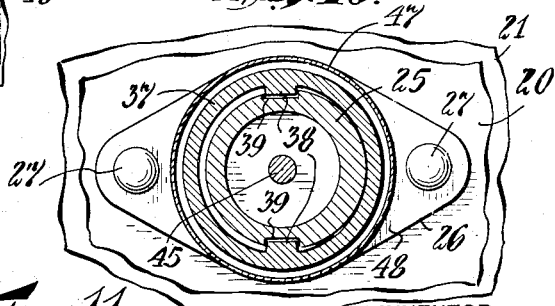
Figure 10 is a cross-section on line X—X of Fig. 2.
Figure 9:
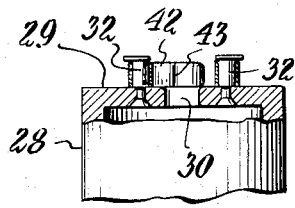
Figure 9 is a sectional elevation on line IX—IX of Fig. 8, but with the stud omitted.
Figure 11:
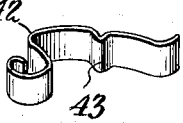
Figure 11 is a perspective view of a spring latch.

In the specific embodiment of the invention illustrated in said drawing, the reference numerals 20, 21 designate two members adapted to be juxtaposed and clamped together by the fastening device of the present invention. These members are representative of any number and thickness of bodies to be clamped together. Dimensional designations $d'$ in Fig. 6 and $d^2$ in Fig. 12 are indicative of said different thicknesses adapted to be clamped by my improved device. Said members have registering holes 22, 23 therein preferably of substantially equal diameter and intended to receive a stud 24 of the fastening device more fully described hereinafter.

The fastening device comprises a fixed cylinder 25 having a bore the same diameter as and in registration with holes 22, 23 of the members. Said cylinder has an external flange 26 at its end next the members, said flange being riveter, as at 27, to the adjacent member. Said fixed cylinder is externally screw threaded and adapted to receive thereover an internally threaded adjustable cylinder or rotatable crown 28. Said crown 28 has an end wall 29 at its upper end, and centrally of said end wall is a slot or aperture 30 of appropriate size and shape to receive a helical or other blade 31 terminating the upper end of stud 24. Offset from the sides of the slot and projecting from said end wall 29 are two pins 32 situated in the path of rotation of the blade to be engaged by the blade after said blade has passed upwardly through the slot and rotated above said end wall. Said blade has an under shoulder 33 which, after passing upward through said slot, and rotated, will overlie the upper end wall 29 of the crown next said pins.

By virtue of said pins 32, rotation of the blade 31 effects a rotation of the crown 28, and since the crown has threaded mounting on the fixed cylinder 25, said rotation of the crown obtains longitudinal movement of the crown. Rotating the stud and crown in a direction unscrewing the crown from the fixed cylinder, and here referred to as clockwise, advances the end wall 29 of the crown toward the shoulder 33 of the stud blade, ultimately clamping the shoulder against said end wall without intervention of any spring.

The end of the stud opposite from said blade and shoulder has a head 34 which underlies the outermost member 21, and thus with the stud pulled inward by the advancement of the crown engaging the stud shoulder, said members 20, 21 are clamped tightly between the flange of the fixed cylinder and the head of the stud. For rotating the stud, said head 34 thereof is shown provided with a kerf 35 for application of a screw-driver thereto. It is to be noted, that the shoulder-engaging end wall 29 of the crown is flat and perpendicular to the axis of the crown and to the axis of the stud, and that the crown and stud are coaxial in their operative assembled condition. Furthermore, adjacent the stud head 34 the stud has a cylindrical bearing portion 36 of substantially the same diameter as the holes in members 20, 21 and bore of the fixed cylinder 25 so as to have a rotating fit therein. This bearing portion 36 will therefore oppose any shearing stresses between the plates, and such shearing stresses consequently cannot tilt the stud 24 both because of the fit of the stud bearing portion 36 in the cylinder 25 and because of the tightness of the clamping.

A feature of the invention is to provide an interlock between the crown 28 and the fixed cylinder 25 such that tool-applied torque is required to rotate the crown in a direction that will release the clamping pressure against the shoulder 33 of the stud blade 31. The interlock here shown includes a retainer or collar 37 on the fixed cylinder 25 between the lower end of the crown 28 and the flange 26 of said cylinder. Said retainer 37 is slidable on said cylinder and kept from rotating thereon by being provided with keys 38 projecting radially inward and riding in longitudinal grooves or keyways 39 in the outer surface of the threaded portion of the fixed cylinder. The lower end edge of the crown 28 and the upper annular face of the retainer 37 have co-operating serrations 40, and a spring 41 under the retainer keeps said retainer in contact with the crown and with the serrations 40 intermeshing.

It is now appropriate to point out that the fastening device of this invention is capable of obtaining a very tight and positive clamping of members of widely differing thicknesses, as it will be seen that the screw thread engagement between the fixed cylinder 25 and the crown 28 permits a very considerable range of adjustment. By utilizing, say 100 threads to the inch, and by providing, say 100 serrations 40, rotational movement of the crown 28 one serration will give a longitudinal movement of said crown of microscopic distance, and for the conditions specified, will only be .0001 of an inch. Consequently a very high compression can be effected without need of requiring accuracy in the thicknesses of said members being clamped by the fastening device of this invention.

An appropriate detent or latch may be provided to keep the blade 31 of the stud 24 in contact with pins 32 of the crown 28 after having been turned into engagement therewith. For this purpose I have a pair of leaf springs 42 each with a hooked end snapped into a longitudinal groove of the respective pins and held from displacement longitudinally of the pin by provision of a partial head on the pin. The other end of each leaf spring 42 is provided with a lateral projection 43 directed toward a lateral edge of the stud blade 31, the spring wedgingly approaching the projection so it will over-ride the edge of the blade as the blade approaches the pin. The projection is shaped so that a considerable torque has to be applied to the stud to release the blade from the catch in the opposite direction, and the force required far exceeds any which would occur from vibration or other causes encountered in use other than intentional release.

For various reasons, it is desirable that said shoulder 33 of the stud blade 31 be retained in contact with the top surface of the upper end 29 of the crown 28 after having been inserted through slot 30 to attain that position. One reason is that the stud head will then show a displacement away from the outer member 21 in event the stud has not been properly tightened. Another reason is that it is desirable that the blade be kept close to the end wall 29 of the crown so as to engage the pins 32 upon rotating the stud. There is accordingly illustrated a spiral spring 44 having a conical contour to provide a small end to fit upon the stem 45 of the stud 24 and a larger end to bear against the under side of the slotted top wall 29 of the crown. The stem 45 is appropriately grooved to receive and retain a resilient split ring 46 at the small or bottom end of the spring. When the stud 24 is introduced and its blade 31 forced up through the slot 30 of the end wall 29, the workman applies both a sliding and twisting pressure on the stud, the twist of the blade assuring that the direction of twist applied by the workman shall be in the proper direction for obtaining the desired engagement of the blade 31 with the pins 32. Preferably the edges of the slot over which the blade rides as it reaches its position of desired insertion are rounded on a small radius to facilitate climb and resting of the blade shoulder 33 onto the said end wall 29 of the crown.

The first time one of the herein described fastening devices is used at a given location, adjustment of more or less extensive longitudinal movement of the crown may be required, but thereafter, on removal, only such rotation as needed to register the blade with the slot and to rotate the blade, due to its spiral, in passing out of the slot will be given the stud in releasing it, and a corresponding, but directionally reversed rotation, to again engage the blade in clamping condition. If necessary, the crown can be backed down an additional amount either by holding the blade in the slot and rotating the stud which in turn rotates the crown, or by removing the stud entirely and using a screw driver in the slot to rotate the crown. Whatever play is thus provided in releasing direction will be readily taken up when the members are to be again clamped by giving the additional rotations needed after the blade is again inserted and in engagement with the pins. Warped members may thus be pulled together and clamped tightly.

Ordinarily for the initial installation, it is preferable to screw the crown 28 down upon the fixed cylinder 25 as far as deemed necessary to accommodate the number and thicknesses of members to be clamped so as to give ample leeway for the stud shoulder 33 to be pushed up above end wall 29 of the crown. With the crown thus retracted, the stud is twistingly forced inward until its shoulder rises above said end wall when continued twisting of the stud rotates the blade into engagement with pins 32, latches 42 then functioning to maintain such engagement. The stud is rotated further after such engagement of blade and pins thereby rotating the crown on its threads and obtaining longitudinal movement of the crown in an extending direction drawing the stud inward and pulling the stud head 34 tighter against the outer member 21 and clamping the members together. During this rotation, the retainer 37 functions as a ratchet, and when the stud is tight said retainer will be seated with serrations intermeshing and the crown kept from turning backward until an applied force of adequate torque is purposely exerted for intentional release.

If so desired, a cover or cap 47 may be provided over the cylinder 25 and crown 28 and related parts. This cap is shown with a bottom flange 48 having eyelets 49 struck therefrom and crimped through the rivet holes in cylinder flange 26 thereby completing a unitary socket member which can be later attached by rivets 27 in position of use. The cap is conveniently provided with an offset 50 in the path of movement of the crown to provide a stop therefor and prevent it from being entirely unscrewed from its engagement with the fixed cylinder.

In conclusion, I wish to point out that the construction of fastening device herein described may be characterized as of universal type in that one size only need be stocked for use with members to be clamped included within a wide range of numbers and thicknesses of such members. The device affords a positive clamping through the agency of solid metal parts having no interposed resiliency, providing great strength and ability to withstand far greater loads than known fastening devices of the prior art of the quick-fastening type. Since the compression is obtained by screw threads having fine pitch and functioning in conjunction with solid practically non-compressible metal parts which are non-resilient under the clamping pressure, clamping ability of the device attains a maximum and the device when thus clamped will withstand extremely high lateral loads with zero deflection within the device or between the clamped members. Since there is no deflection and no opportunity for vibration between the positively and tightly clamped members, there is no opportunity for lateral movement or wear of said members. Thus, as with airplane plates which have a special coating thereon to prevent undesirable weather effect, the area where the plates are clamped will remain intact, whereas with prior art devices wear has occurred and the metal detrimentally affected. Furthermore, while the invention has been shown and described in detail as to one embodiment thereof, it will be understood that various modifications and changes within the skill of persons versed in the art, may be made without departing from the spirit or scope of my invention.

I claim:

1. A fastening device for clamping members together, comprising a cylinder adapted to be secured axially perpendicular to one of said members, said cylinder being hollow and open at both ends and having external screw threads, a crown cylinder overlapping said stationary cylinder and having internal screw threads engaging the external screw thread of the stationary cylinder, said crown cylinder having an end wall at its end away from the stationary cylinder and said end wall having a stud-receiving aperture, a retainer slidable on said cylinder and located next the overlapping end of the crown cylinder, said overlapping end of the crown cylinder and the adjacent face of the retainer having serrations, a spring pressing the serrated face of the retainer into releasable engagement with the serrations of the crown cylinder, and means for preventing the retainer from rotating.

2. A fastening device for clamping members together, comprising a stationary cylinder adapted to be secured axially perpendicular to one of said members, said stationary cylinder being hollow and open at both ends and having external screw threads, a crown cylinder overlapping said stationary cylinder and having internal screw threads engaging the external screw threads of the stationary cylinder, said crown cylinder having an end wall at its end away from the stationary cylinder and said end wall having a stud-receiving aperture, a retainer slidable on said stationary cylinder and located next the overlapping end of the crown cylinder, said overlapping end of the crown cylinder and the adjacent face of the retainer having serrations, a spring pressing the serrated face of the retainer into releasable engagement with the serrations of the crown cylinder, said stationary cylinder having an external longitudinal keyway therein, and said retainer having an inwardly projecting key riding in said keyway for preventing the retainer from rotating.

3. A fastening device for clamping members together, comprising a stationary cylinder adapted to be secured axially perpendicular to one of said members, said stationary cylinder being hollow and open at both ends and having external screw threads and a cylindrical bore therein, a crown cylinder overlapping said stationary cylinder and having internal screw threads engaging the external screw threads of the stationary cylinder, said crown cylinder having an end wall at its end away from the stationary cylinder and said end wall having a stud-receiving aperture, and a cap secured to said flange of the stationary cylinder and surrounding said stationary cylinder and crown cylinder and having an offset overlying the said crown cylinder for preventing the crown cylinder from being completely unscrewed from the cylinder.

4. A fastening device comprising a stud having a helical blade and a shoulder at the under edge of the blade, a socket having a stationary cylinder and a rotatable crown cylinder in threaded engagement, said stationary cylinder having a continuity of uninterrupted bore therethrough and said walls of the cylinder being of constant and uninterrupted thickness and having external threads thereon, said crown cylinder having an end with a transverse slot for passage of said blade therethrough thereby enabling said shoulder to over-ride the end of the crown, protruding means on the end of the crown in the path of rotation of said blade whereby rotation of the blade rotates the crown cylinder on its threaded engagement with the stationary cylinder, resilient latches mounted on said protruding means for releasably securing said blade in contact with said protruding means, and spring means for ejecting the shoulder end of the blade from said slot when released from said latches and rotated to register with said slot.

References Cited in the file of this patent

UNITED STATES PATENTS

| | | |
|---|---|---|
| 1,639,661 | Newcomb | Aug. 23, 1927 |
| 2,355,196 | Zahodiakin | Aug. 8, 1944 |
| 2,438,028 | Allen | Mar. 16, 1948 |
| 2,486,411 | Huelster | Nov. 1, 1949 |
| 2,499,574 | Dzus | Mar. 7, 1950 |
| 2,542,968 | Zahodiakin | Feb. 20, 1951 |
| 2,571,641 | Wing | Oct. 16, 1951 |
| 2,691,199 | Schlueter | Oct. 12, 1954 |